United States Patent [19]

Kakizawa

[11] Patent Number: 5,686,540
[45] Date of Patent: Nov. 11, 1997

[54] PROCESS FOR THE PREPARATION OF LACTIC ACID-BASED POLYESTER

[75] Inventor: Yasutoshi Kakizawa, Chiba, Japan

[73] Assignee: Dainippon Ink and Chemicals, Inc., Tokyo, Japan

[21] Appl. No.: 722,599

[22] Filed: Sep. 27, 1996

[30] Foreign Application Priority Data

Sep. 29, 1995 [JP] Japan .................... 7-252263
Oct. 11, 1995 [JP] Japan .................... 7-262832

[51] Int. Cl.$^6$ .................................. C08F 20/00
[52] U.S. Cl. .................. 525/444; 528/354; 528/356; 528/361; 528/363; 525/437; 525/438; 525/440; 525/444; 525/450; 524/86; 524/115; 524/127
[58] Field of Search .................... 528/354, 356, 528/361, 363; 525/437, 438, 440, 444, 450; 524/86, 115, 127

[56] References Cited

U.S. PATENT DOCUMENTS

| | | | |
|---|---|---|---|
| 4,795,644 | 1/1989 | Zentner | 424/468 |
| 4,814,183 | 3/1989 | Zentner | 424/485 |
| 5,202,413 | 4/1993 | Spinu | 528/354 |
| 5,292,859 | 3/1994 | Ford et al. | |
| 5,338,822 | 8/1994 | Gruber et al. | |
| 5,444,113 | 8/1995 | Sinclair et al. | 524/306 |
| 5,502,158 | 3/1996 | Sinclair et al. | 528/354 |
| 5,522,896 | 6/1996 | Prescott | 623/16 |

FOREIGN PATENT DOCUMENTS

| | | |
|---|---|---|
| WO 91/16368 A | 10/1991 | European Pat. Off. |
| WO 92/04413 A | 3/1992 | European Pat. Off. |
| 0 591 978 | 4/1994 | European Pat. Off. |
| 36 41 692 | 6/1988 | Germany. |
| 43 00 420 | 7/1994 | Germany. |

OTHER PUBLICATIONS

Patent Abstracts of Japan, vol. 95, No. 004 of JP 07 109413 A (Mitsui Toatsu Chem Inc), Apr. 25, 1995.
Patent Abstracts of Japan, vol. 011, No. 202 (C–432), Jun. 30, 1987 of JP 62 025121 A (Taki Chem Co. Ltd.), Feb. 3, 1987.
Patent Abstracts of Japan, vol. 018, No. 248 (C–1198), 12 May 1994 of JP 06 030982 A (Taki Chem Co. Ltd); Others 01), Feb. 8, 1994.
Patent Abstracts of Japan, vol. 95, No. 005 of JP 07 118513 A (Dainippon Ink & Chem Inc), May 9, 1995.
Patent Abstracts of Japan, vol. 9, No. 006 of JP 07 157553 A (Agency of Ind. Science & Technol; Others: 01), Jun. 20, 1995.

*Primary Examiner*—Samuel A. Acquah
*Attorney, Agent, or Firm*—Armstrong, Westerman, Hattori, McLeland & Naughton

[57] ABSTRACT

The present invention provides a process for the preparation of a biodegradable lactic acid-based polyester composition excellent in thermal stability, storage stability, flexibility, heat resistance, mechanical and physical properties and moldability which comprises kneading a lactic acid-based polyester and a polyester consisting of dicarboxylic acid component(s) and diol component(s) with a chelating agent, an acidic phosphoric acid ester, a molecular weight increasing agent, etc., and then devolatizing the kneaded mixture. The present invention also provides a molding process of the foregoing lactic acid-based polyester composition. A novel process for the preparation of a lactic acid-based polyester composition is provided, which comprises melt-kneading a lactic acid-based polyester (A), a polyester (B) consisting of dicarboxylic acid component(s) and diol component(s) and a chelating agent and/or acidic phosphoric acid ester (C) in an amount such that the weight ratio (A)/(B is from 99/1 to 10/90 and the proportion of (C) is 0.001 to 5 parts by weight based on 100 parts by weight of the sum of (A) and (B). A novel process for molding a lactic acid-based polyester composition is also provided, which comprises kneading a lactic acid-based polyester (A) and a polyester (B) consisting of dicarboxylic acid component(s) and diol component (s) with a chelating agent and/or acidic phosphoric acid ester (C), and then molding the material.

12 Claims, No Drawings

PROCESS FOR THE PREPARATION OF LACTIC ACID-BASED POLYESTER

FIELD Of THE INVENTION

The present invention relates to a process for the preparation of a flexible biodegradable lactic acid-based polyester composition composed of a lactic acid-based polyester, a polyester consisting of dicarboxylic acid component(s) and diol component(s) and a chelating agent and/or acidic phosphoric acid ester having a less residual volatile component, particularly a less residual lactide, and an excellent thermal stability and a molding process of a composition prepared by such a preparation process.

More particularly, the present invention relates to a process for the preparation of a lactic acid-based polyester composition having a less residual lactide and excellent mechanical strength and flexibility which is less susceptible to decomposition of lactic acid-based polyester and attachment of sublimed residual lactide to the apparatus, molded articles, etc. at the molding step, etc. and a molding process of a composition prepared by such a preparation process.

BACKGROUND OF THE INVENTION

Plastics have found wide application in many fields because of its light weight and excellent durability and good colorability and moldability. On the other hand, plastics are extremely chemically stable compounds. When discarded, plastics undergo little decomposition and accumulate in natural environment to pollute rivers, ocean and soil, raising a great social problem. As a countermeasure of inhibiting the environmental pollution there has been keenly desired the development of biodegradable plastics which can decompose with microorganisms in the soil and water and then get into a material chain system in natural environment to inhibit the environmental pollution.

For example, extensive studies have been made of the use of polylactic acids, which exhibit a good biodegradability and harmlessness, as general-purpose polymers. However, polylactic acids are hard and brittle. Thus, in order to overcome these difficulties, studies have been made of the blending or copolymerization of polylactic acids with flexible polymers.

The blending or copolymerization of polylactic acids with polyesters consisting of dicarboxylic acid component and diol component is disclosed in JP-W-4-504731 (The term "JP-W" as used herein means an "unexamined PCT application published in Japan") and U.S. Pat. No. 5,202,413. JP-W-4-504731 describes the blending of polylactic acids with a polyethylene terephthalate or copolymerization of polylactic acids with a polyethylene terephthalate in the presence of an ester interchange catalyst. However, a polyethylene terephthalate has a high melting point that makes it necessary to effect the melt-blending or copolymerization with a polylactic acid at a high temperature where the polylactic acid is partly decomposed. The resulting blend or copolymer is colored, malodorous and opaque. The blend or copolymer has a low molecular weight, lacks flexibility and shows a low mechanical strength. Further, the blend or copolymer exhibits a deteriorated biodegradability.

U.S. Pat. No. 5,202,413 describes a blend of a polylactic acid with a polyester consisting of an aliphatic dicarboxylic acid component and an aliphatic diol component. However, since the polyester has a low molecular weight, the blend cannot be provided with satisfactory flexibility, mechanical strength, heat resistance and moldability. Further, a copolymer of a polylactic acid with a polycaprolactone disclosed in JP-A-63-145661 (The term "JP-A" as used herein means an "unexamined published Japanese patent application") has a relatively good flexibility but shows a low heat resistance and is opaque. Thus, the application of the copolymer is drastically restricted.

In general, a blend or copolymer of a polylactic acid with the foregoing polyester has a great residual lactide content. Thus, such a blend or copolymer leaves something to be desired in moldability and heat resistance. Accordingly, such a blend or copolymer is disadvantageous in that it decomposes too fast and shows too poor a storage stability to find application as general-purpose polymers, except for special application. In particular, such a polymer is subject to drop of molecular weight due to heat during molding. Further, lactide and other foreign matters are attached to the molding apparatus or molded articles. The resulting molded articles cannot attain sufficient physical properties and thus can be rejected at a high percentage. Further, lactide causes some troubles on the molding apparatus. This is probably because lactides left during polymerization and reproduced during molding decompose with water content in the atmosphere to produce an organic acid which then breaks the polymer chain.

Thus, extensive studies have been made of the reduction of residual lactide in a lactic acid-based polyester such as polylactic acid and blend or copolymer of a polylactic acid with other polyesters. Referring to the process for the removal of lactide from lactic acid-based polyesters, a process which comprises dipping a lactic acid-based polyester in a solvent to extract lactide therefrom or a process which comprises dissolving a polymer in a good solvent, and then allowing the polymer to be precipitated in a poor solvent has been conducted on a laboratory basis. On an industrial basis, a method using a biaxial extruder is disclosed in EP 532154. JP-A-5-93050 discloses a method which comprises the removal of a volatile component in a pot under reduced pressure.

However, these methods are apt to the reproduction of lactide even if lactide is removed under reduced pressure at an elevated temperature, making it impossible to eliminate lactide from the polymer with ease. This is because the catalyst used in polymerization also acts as a catalyst for the reaction of production of lactide from the polymer chain.

JP-A-6-116381 discloses a method for the removal of a catalyst from a polylactic acid prepared from lactic acid in the presence of a solvent. This method comprises the removal of a catalyst from a polylactic acid in the presence of a large amount of a solvent. In some detail, an organic hydrophilic solvent and a weak acid are added to a polylactic acid dissolved in a solvent to remove a catalyst from the system. The polylactic acid is deposited in powder, granular, particulate, flake or block form. The bulk density of the product is relatively high as 0.6 g/ml. Further, this procedure requires a relatively long time for removing a catalyst. In addition, the resulting waste solvent containing a complex mixture requires a complicated disposal. Thus, this method is also industrially unsuitable. Moreover, this method is disadvantageous in that if the solvent is used in a small amount, the catalyst cannot be thoroughly removed.

SUMMARY OF THE INVENTION

It is therefore an object of the present invention to provide a process for the preparation of a lactic acid-based polyester composition excellent in mechanical strength such as flexibility and heat resistance, moldability, storage stability and biodegradability.

It is another object of the present invention to provide a molding process of a composition prepared by the foregoing preparation process.

The foregoing object of the present invention will become more apparent from the following detailed description and examples.

The inventors made extensive studies of the solution to the foregoing problem. As a result, it was found that the melt-kneading of a lactic acid-based polyester and polyester consisting of dicarboxylic acid component(s) and diol component(s) with a chelating agent and/or acidic phosphoric acid ester, followed by the devolatilization on of residual volatile components, particularly residual lactide, under reduced pressure, makes it possible to obtain a biodegradable lactic acid-based polyester composition having an improved thermal stability and excellent moldability, storage stability, flexibility and mechanical strength. Thus, the present invention has been worked out.

The present invention concerns a process for the preparation of a lactic acid-based polyester which comprises melt-kneading a lactic acid-based polyester (A), a polyester (B) consisting of dicarboxylic acid component(s) and diol component(s), and a chelating agent and/or acidic phosphoric acid ester (C).

The present invention also concerns a process for the preparation of a lactic acid-based polyester composition, which comprises melt-kneading either of a lactic acid-based polyester (A) or a polyester (B) consisting of dicarboxylic acid component(s) and diol component(s) with a chelating agent and/or acidic phosphoric acid ester (C), and then melt-kneading the resulting material with the remainder of said polyester (A) or said polyester (B), or comprises melt-kneading a lactic acid-based polyester (A) with a chelating agent and/or acidic phosphoric acid ester (C) and melt-kneading a polyester (B) consisting of dicarboxylic acid component(s) and diol component(s) with a chelating agent and/or acidic phosphoric acid ester (C), separately, and then melt-kneading the both resulting materials.

More particularly, the present invention concerns a process for the preparation of a lactic acid-based polyester composition, which comprises melt-kneading a melt-kneaded mixture of a lactic acid-based polyester (A) and a chelating agent and/or acidic phosphoric acid ester (C) with a polyester (B) consisting of dicarboxylic acid component(s) and diol component(s).

The present invention further concerns the foregoing process for the preparation of a lactic acid-based polyester composition, wherein the weight ratio of said lactic acid-based polyester (A) to said polyester consisting of dicarboxylic acid component(s) and diol component(s) (B) is from 99/1 to 10/90 and the proportion of said chelating agent and/or acidic phosphoric acid ester (C) is from 0.001 to 5 parts by weight based on 100 parts by weight of the sum of (A) and (B).

The present invention further concerns the foregoing process for the preparation of a lactic acid-based polyester composition, wherein a molecular weight increasing agent (D) is added to said lactic acid-based polyester (A) and/or polyester (B) consisting of dicarboxylic acid component(s) and diol component(s) in an amount of from 0.001 to 5 parts by weight based on 100 parts by weight of the sum of (A) and (B) before or at the same time with the melt-kneading with said chelating agent and/or acidic phosphoric acid ester (C).

The present invention further concerns the foregoing process for the preparation of a lactic acid-based polyester composition, wherein the melt-kneading with said chelating agent and/or acidic phosphoric acid ester (C) is followed by the removal of volatile components under reduced pressure.

The present invention further concerns the foregoing process for the preparation of a lactic acid-based polyester composition, wherein said lactic acid-based polyester (A) is a polylactic acid. The present invention further concerns a lactic acid-based polyester composition prepared by the foregoing preparation process.

The present invention further concerns the foregoing molding process of a lactic acid-based polyester composition, which comprises kneading a lactic acid-based polyester (A) and e polyester (B) consisting of dicarboxylic acid component(s) and diol component(s) with a chelating agent and/or acidic phosphoric acid ester (C), and then molding the material.

The present invention further concerns a molding process of a lactic acid-based polyester composition, which comprises melt-kneading a lactic acid-based polyester (A) and a polyester (B) consisting of dicarboxylic acid component(s) and diol component(s) with a chelating agent and/or acidic phosphoric acid ester (C), removing volatile components from the material under reduced pressure, and then molding the material.

More particularly, the present invention concerns molding process of a lactic acid-based polyester composition, which comprises melt-kneading a lactic acid-based polyester (A) with a chelating agent and/or acidic phosphoric acid ester (C), removing volatile components from the material under reduced pressure, kneading the material with a polyester (B) consisting of dicarboxylic acid component(s) and diol component(s), and then molding the material. In particular, the present invention concerns the foregoing molding process of a lactic acid-based polyester composition, wherein the lactic acid-based polyester (A) is a polylactic acid.

The present invention further concerns the foregoing molding process of a lactic acid-based polyester composition, wherein a molecular weight increasing agent (D) is added to said lactic acid-based polyester (A and/or a polyester B) consisting of dicarboxylic acid component(s) and component(s) before or at the same time with the melt-kneading with said chelating agent and/or acidic phosphoric acid ester (C).

The present invention further concerns a process for the preparation of a lactic acid-based polyester composition having a less volatile content, which comprises the reduction of volatile components in a lactic acid-based polyester component at a temperature of from 130° C. to 250° C. and a pressure of from 0.01 to 50 torr by means of a vessel type devolatilizer, thin film type devolatilizer or vented extruder.

DETAILED DESCRIPTION OF THE INVENTION

The present invention will be further described hereinafter.

The lactic acid-based polyester composition of the present invention comprises a lactic acid-based polyester, a polyester consisting of dicarboxylic acid component(s) and diol component(s), a chelating agent and/or acidic phosphoric acid ester, and optionally a molecular weight increasing agent. Among these constituents, the chelating agent and acidic phosphoric acid ester are important factors that complex metal ions in a catalyst contained in the lactic acid-based polyester or polyester consisting of dicarboxylic acid component(s) and diol component(s) to deactivate the catalyst and hence improve the thermal stability, storage stability and moldability of the composition. The molecular weight increasing agent acts to drastically enhance the flexibility and mechanical strength of the composition.

The constituents of the lactic acid-based polyester composition of the present invention will be sequentially described.

The lactic acid-based polyester is not specifically limited. Examples of the lactic acid-based polyester employable herein include polylactic acid, copolymer of lactic acid with hydroxycarboxylic acid such as 3-hydroxybutyric acid, 4-hydroxybutyric acid, 3-hydroxyvaleric acid, 4-hydroxyvaleric acid, 5-hydroxyvaleric acid, glycolic acid, dimethylglycolic acid, β-hydroxypropanic acid, α-hydroxybutyric acid, α-hydroxycaproic acid, β-hydroxycaproic acid, γ-hydroxycaproic acid, δ-hydroxycaproic acid, δ-hydroxymethylcaproic acid, ε-hydroxycaproic acid and ε-hydroxymethylcaproic acid, copolymer of lactide with cyclic ester such as glycolide, ε-caprolactone, γ-valeroactone, γ-undecalactone and β-methyl-δ-valerolactone or polyester consisting of dicarboxylic acid component(s) and diol component(s), and copolymer of mixture thereof.

The process for the preparation of the lactic acid-based polyester is not specifically limited. Examples of the preparation process employable herein include polycondensation of lactic acid or lactic acid with a hydroxycarboxylic acid other than lactic acid, ring-opening polymerization of lactide or lactide with a cyclic ester other than lactide, and ring-opening polymerization or ester interchange reaction of lactide with a polyester consisting of a dicarboxylic acid and diol component(s).

For example, a lactic acid-based polyester such as polylactic acid and copolymer of lactic acid can be prepared by the dehydro-condensation of lactic acid or its copolymerizable components in the presence or absence of a solvent as disclosed in JP-A-6-172502 and JP-A-7-172425 or by the ring-opening polymerization of lactide as a dimer obtained by the dehydro-cyclization of lactic acid or its copolymerizable component in the presence of a catalyst as disclosed in "Polymer", Vol. 20, 1459 (1979).

Lactic acid is a monomer having stereoisomerism. There are L-lactic acid and D-lactic acid. A polymer containing L-lactic acid or D-lactic acid alone can crystallize to attain a high melting point. Examples of lactide as a dimer obtained by dehydro-cyclization of lactic acid include isomers such as D-lactide, L-lactide and mesolactide. A polymer containing D-lactide or L-lactide alone can crystallize to attain a high melting point. The lactic acid-based polyester of the present invention can comprise the two lactic acids or the three lactides in combination to realize preferred polymer characteristics.

In particular, in order to provide the lactic acid-based polyester with an excellent heat resistance, the lactic acid component preferably has a high optical activity. In some detail, the lactic acid component to be incorporated in the lactic acid-based polyester of the present invention preferably comprises L-lactic acid or D-lactic acid in proportion of not less than 70% based on the total content of the lactic acid component. Further, in order to attain a higher thermophysical properties, the lactic acid component to be used preferably comprises L-lactic acid or D-lactic acid in a proportion of not less than 80% based on the total content of the lactic acid component. In the case where lactide is used, too, the lactic acid component to be used preferably comprises L-lactide or D-lactide in a proportion of not less than 70% based on the total content of the lactic acid component.

Further, in order to attain a higher thermophysical properties, the lactic acid component to be used preferably comprises L-lactide or D-lactide in a proportion of not less than 80% based on the total content of the lactide.

In particular, L-lactic acid can be obtained in a higher purity at a lower cost by fermentation than the other forms on a commercial basis. Therefore, as the lactic acid component constituting the lactic acid-based polyester there is preferably used L-lactic acid. As lactide constituting the lactic acid-based polyester there is preferably used L-lactide. In general, it is known that polylactic acids lack flexibility. Thus, polylactic acids can be kneaded with a polyester consisting of a dicarboxylic acid and diol component(s) to have an improved flexibility.

Specific examples of the dicarboxylic acid component constituting the polyester include aromatic dicarboxylic acid such as phthalic anhydride, isophthalic acid, terephthalic acid and 2,6-naphthalenedicarboxylic acid. Other examples of the dicarboxylic acid include aliphatic dicarboxylic acid such as succinic acid, methylsuccinic acid, adipic acid, 2-methyladipic acid, methylglutaric acid, azelaic acid, sebacic acid, brassylic acid, dodecanedicarboxylic acid, cyclohexanedicarboxylic acid, maleic anhydride, fumaric acid, itaconic acid and dimeric acid, and mixture thereof. In particular, if a $C_{4-20}$ aliphatic dicarboxylic acid component is used, it provides an improved flexibility. If an aliphatic dicarboxylic acid having a double bond such as maleic anhydride, fumaric acid, itaconic acid and dimeric acid is used, it provides an enhanced heat resistance.

In order to provide a high molecular weight, a polyvalent carboxylic acid such as (anhydrous) trimellitic acid, (anhydrous) pyromellitic acid, (anhydrous) 3,3',4,4'-benzophenonetetracarboxylic acid, 1,2,3,4-butanetetracarboxylic acid and Epiclon 4400 (available from Dainippon Ink & Chemicals, Inc.) or a mixture thereof may be partly used.

The kind of the diol component constituting the polyester is not specifically limited. Examples of the diol component employable herein include ethylene glycol, propylene glycol, 1,2-butylene glycol, 2,3-butylene glycol, 1,3-butylene glycol, 1,4-butylene glycol, 1,4-pentanediol, 1,5-pentanediol, 2,4-pentanediol, 1,6-hexanediol, octanediol, neopentyl glycol, cyclohexanedimethanol, 2,2,4-trimethylpentane-1,3-diol, hydrogenated bisphenol A, xylene glycol, diethylene glycol, triethylene glycol, dipropylene glycol, tripropylene glycol, and mixture thereof.

If a polyoxyalkylene containing many oxygen atoms of ether bond is used as diol component(s), it provides an excellent flexibility. Examples of the polyoxyalkylene employable herein include polyethylene glycol, polypropylene glycol, polybutyl glycol, polypentanediol, polytetramethylene glycol, and block copolymer of polyethylene glycol with polypropylene glycol.

Further, if an aliphatic dicarboxylic acid component and an aliphatic diol component are used as the dicarboxylic acid component and diol component constituting the polyester, the resulting lactic acid-based polyester has an excellent biodegradability and flexibility. If such components having branched chains are used, the resulting lactic acid-based polyester tends to have an excellent transparency.

The polyester consisting of dicarboxylic acid component (s) and diol component(s) can be prepared by the dehydration, deglycolation condensation or ester interchange reaction of dicarboxylic acid component(s) and diol component(s) in the presence of an esterification catalyst The polyester consisting of dicarboxylic component(s) and diol component(s) preferably has a weight-average molecular weight of from 10,000 to 400,000, more preferably from 20,000 to 300,000. If the weight-average molecular weight of the polyester falls below 10,000, satisfactory mechanical and physical properties cannot be obtained. On the contrary, if the weight-average molecular weight of the polyester exceeds 400,000, it is undesirable from the standpoint of productivity and moldability. Further, it is preferred that the polyester normally stays solid to undergo little or no bleeding after molding Moreover, if the softening point of the polyester consisting of dicarboxylic acid component(s) and diol component(s) is higher than that of the lactic acid-based polyester, the resulting lactic acid-based polyester composition has an enhanced heat resistance.

Examples of the chelating agent employable herein include organic chelating agents and inorganic chelating agents. The organic chelating agents have little hygroscopicity and an excellent thermal stability.

The organic chelating agents employable herein are not specifically limited. Examples of the organic chelating agents include amino acids, phenols, hydroxycarboxylic acids, diketones, amines, oximes, phenathrolines, pyridine compounds, dithio compounds, phenols including coordinated atom N, carboxylic acids including coordinated atom N, diazo compounds, thiols, and porphyrins, These organic chelating agents complex a metal ion in a catalyst contained in the lactic acid-based polyester composition to deactivate the catalyst.

Specific examples of the amino acids include glycine, leucine, alanine, satins, α-aminobutyric acid, acetylaminoacetic acid, glycyl glycine, and glutamic acid.

Specific examples of the phenols include alizarin, t-butylcatechol, 4-isopropyltroboron, chromotropic acid, tiron, oxyne, and propyl gallate.

Specific examples of the hydroxycarboxylic acid include tartaric acid, oxalic acid, citric acid, monooctyl citrate, dibenzoyl-D-tartaric acid, and di-p-toluoyl-D-tartaric acid.

Specific examples of the diketones include acetylacetone, hexafluoroacetylacetone, benzoylacetone, thenoyltrifluoroacetone, and trifluoroacetylacetone.

Specific examples of the amines include ethylenediamine, diethylenetriamine, 1,2,3-triaminopropane, thiodiethylamine, triethyltetramine, triethanolamine, tetraethylenepentamine, and pentaethylenehexamine.

Specific examples of the oximes include dimethylglyoxime, α,α-furyldioxime, and salicylaldooxime.

Specific examples of the phenathrolines include neocuproine, and 1,10-phenanthroline.

Specific examples of the pyridine compounds include 2,2-bipyridine, and 2,2', 2"-terpyridyl.

Specific examples of the dithio compounds include xanthogenic acid, diethyldithiocarbamic acid, and toluene-3,4-dithiol.

Specific examples of the phenols including coordinated atom N include o-aminophenol, oxine, nitroso-R salt, 2-nitroso-5-dimethylaminophenol, 1-nitroso-2-naphthol, and 8-selenoquinoline.

Specific examples of the carboxylic acids including coordinated atom N include quinaldinic acid, nitrilotriacetic acid, ethylenediaminediacetic acid, hydroxyethylethylenediaminetriacetic acid, ethylenediaminetetraacetic acid, transcyclohexanediaminetetraacetic acid, diethylenetriaminepentaacetic acid, triethylenetetraminehexaacetic acid, anilinediacetic acid, 2-sulfoanilinediacetic acid, 3-sulfoanilinediacetic acid, 4-sulfoanilinediacetic acid, 2-aminobenzoic acid-N,N-diacetic acid chelate, 3-aminobenzoic acid-N,N-diacetic acid chelate, 4-aminobenzoic acid-N,N-diacetic acid chelate, methylaminediacetic acid, β-alanine-N,N-diacetic acid chelate, β-aminoethylsulfonic acid-N,N-diacetic acid chelate, and β-aminoethylphosphonic acid-N,N-diacetic acid chelate.

Specific examples of the diazo compounds include diphenylcarbazone, magneson, dithizone, eriochrome black T, 4-(2-thiazoylazo)resorcin, and 1-2-pyridylazo)-2-naphthol.

Specific examples of the thiols include thioxine, thionalide, 1,1-trifluoro-4-(2-thienyl)-4-mercapto-3-butene-2-one, and 3-mercapto-p-cresol.

Specific examples of the porphyrins include tetraphenylporphyrin, tetrakis(4-N-methylpyridyl)porphine, cupferron, murexide, polyethyleneimine, polymethylacryloylacetone, polyacrilic acid, and mixture thereof.

Among these organic chelating agents, those which makes an efficient coordinated bonding to metal ions in the catalyst contained in the lactic acid-based polyester or the polyester consisting of dicarboxylic acid component(s) and diol component(s) to inhibit the break of the polymer chain are carboxylic acid including coordinated atom N such as nitrilotriacetic acid, ethylenediaminediacetic acid, tetraethylenepentamine, hydroxyethylethylenediaminetriacetic acid, ethylenediaminetetraacetic acid, transcyclohexanediaminetetraacetic acid, diethylenetriaminepentaacetic acid and triethylenetetraminehexaacetic acid, and hydroxycarboxylic acid such as tartaric acid, dibenzoyl-D-tartaric acid, di-p-toluoyl-D-tartaric acid, citric acid and monooctyl citrate. In particular, the foregoing carboxylic acid including coordinated atom N has an excellent thermal stability and storage stability. The foregoing hydroxycarboxylic acid colors the lactic acid-based polyester little.

The inorganic chelating agents have a high hygroscopicity. When moistened, the inorganic chelating agents lose its effect. Therefore, care must be observed in handling it. Specific examples of the inorganic chelating agents employable herein include phosphoric acids such as phosphoric acid, phosphorous acid, pyrophosphoric acid and polyphosphoric acid.

The amount of the organic chelating agent or inorganic chelating agent to be incorporated depends on its kind or the kind and content of the catalyst contained in the lactic acid-based polyester or the polyester consisting of dicarboxylic acid component(s) and diol component(s) but is preferably from 0.001 to 5 parts by weight based of the total weight of the lactic acid-based polyester and the polyester consisting of dicarboxylic acid component(s) and diol. component(s) or from 0.1 to 100 parts by weight based on 1 part by weight of the catalyst used.

The use of any of these chelating agents can minimize the break of polymer chains. These organic chelating agents and inorganic chelating agents may be used in admixture. The acidic phosphoric acid ester to be used in the present invention complexes metal ions in the catalyst contained in the lactic acid-based polyester composition to deactivate the catalyst and hence exert a great effect of inhibiting the break of polymer chains.

Examples of the acidic phosphoric acid ester include acidic phosphoric acid ester, phosphonic acid ester, alkylphosphonic acid, and mixture thereof. The general formula of such an acidic phosphoric acid ester will be given below.

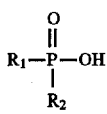

wherein $R_1$ represents an alkyl group or alkoxyl group; and $R_2$ represents an alkyl group, alkoxyl group or hydroxy group.

Specific examples of the acidic phosphoric acid ester include phosphoric acid monomethyl, phosphoric acid dimethyl, phosphoric acid monoethyl, phosphoric acid diethyl, phosphoric acid monopropyl, phosphoric acid dipropyl, phosphoric acid monoisopropyl, phosphoric acid diisopropyl, phosphoric acid monobutyl, phosphoric acid dibutyl, phosphoric acid monopentyl, phosphoric acid dipentyl, phosphoric acid monohexyl, phosphoric acid dihexyl, phosphoric acid monooctyl, phosphoric acid dioctyl, phosphoric acid mono-2-ethylhexyl, phosphoric acid di-2-ethylhexyl, phosphoric acid monodecyl, phosphoric acid didecyl, phosphoric acid monoisodecyl, phosphoric acid diisodecyl, phosphoric acid monoundecyl, phosphoric acid diundecyl, phosphoric acid monododecyl, phosphoric acid didodecyl, phosphoric acid monotetradecyl, phosphoric acid ditetradecyl, phosphoric acid monohexadecyl, phosphoric acid dihexadecyl, phosphoric acid monooctadecyl, phosphoric acid dioctadecyl, phosphoric acid monophenyl, phosphoric acid diphenyl, phosphoric acid monobenzyl, and phosphoric acid dibenzyl.

Examples of the phosphonic acid ester include phosphonic acid monomethyl, phosphonic acid monoethyl, phosphonic acid monopropyl, phosphonic acid monoisopropyl, phosphonic acid monobutyl, phosphonic acid monopentyl, phosphonic acid monohexyl, phosphonic acid monooctyl, phosphonic acid monoethylhexyl, phosphonic acid monodecyl, phosphonic acid monoisodecyl, phosphonic acid monoundecyl, phosphonic acid monododecyl, phosphonic acid monotetradecyl, phosphonic acid monohexadecyl, phosphonic acid monooctadecyl, phosphonic acid monophenyl, and phosphonic acid monobenzyl.

Examples of the alkylphosphonic acid include monomethylphosphonic acid, dimethylphosphonic acid, monoethylphosphonic acid, diethylphosphonic acid, monopropylphosphonic acid, dipropylphosphonic acid, monoisopropylphosphonic acid, diisopropylphosphonic acid, monobutylphosphonic acid, dibutylphosphonic acid, monopentylphosphonic acid, dipentylphosphonic acid, monohexylphosphonic acid, dihexylphosphonic acid, isooctylphosphonic acid, dioctylphosphonic acid, monoethylhexylphosphonic acid, diethylhexylphosphonic acid, monodecylphosphonic acid, didecylphosphonic acid, monoisodecylphosphonic acid, diisodecylphosphonic acid, monoundecylphosphonic acid, diundecylphosphonic acid, monododecylphosphonic acid, didodecylphosphonic acid, monotetradecylphosphonic acid, ditetradecylphosphonic acid, monohexadecylphosphonic acid, dihexadecylphosphonic acid, monooctadecylphosphonic acid, dioctadecylphosphonic acid, monophenylphosphonic acid, diphenylphosphonic acid, monobenzylphosphonic acid, dibenzylphosphonic acid, and mixture thereof.

These acidic phosphoric acid esters can be well dissolved in an organic solvent end thus can be well worked and exhibit a good reactivity with lactic acid-based polyesters. In particular, the acidic phosphoric acid ester exerts a great effect of deactivating the catalyst. The amount of the acidic phosphoric acid esters to be incorporated depends on its kind, the kind of the catalyst used and the kneading conditions but is preferably from 0.001 to 5 parts by weight based on the total weight of the lactic acid-based polyester and the polyester consisting of dicarboxylic acid component(s) and diol component(s) or from 0.1 to 100 parts by weight based on 1 part by weight of the catalyst used.

Examples of the molecular weight increasing agent employable herein include polyvalent carboxylic acid, metal complex, epoxy compound, isocyanate, and mixture thereof.

Examples of the polyvalent carboxylic acid include (anhydrous) phthalic acid, (anhydrous) maleic acid, trimethyladipic acid, trimesic acid, (anhydrous) trimellitic acid, (anhydrous) pyromellitic acid, (anhydrous) 3,3',4,4'-benzophenonetetracarboxylic acid, 1,2,3,4-butanetetracarboxylic acid, Epiclon 4400 (available from Dainippon Ink & Chemicals, Inc.), and mixture thereof. In particular, trifunctional or higher carboxylic acids are effective for the rise in the molecular weight of the lactic acid-based polyester composition and thus are desirable.

Examples of the metal complex include lithium formate, sodium methoxide, potassium propionate, magnesium ethoxide, calcium propionate, manganese acetyl acetonate, cobalt acetyl acetonate, zinc acetyl acetonate, cobalt acetyl acetoners, iron acetyl acetonate, aluminum acetyl acetonate, aluminum isopropoxide, and tetrabutoxytitanium. In particular, divalent or higher metal complexes are desirable, Examples of the epoxy compound employable herein include bisphenol A type diglycidyl ether, 1,6-hexanediol diglycidyl ether, trimethylol propane triglycidyl ether, terephthalic acid diglycidyl ester, tetrahydrophthalic acid diglycidyl ester, o-phthalic acid diglycidyl ester, 3,4-epoxycyclohexylmethyl-3,4-epoxycyclohexanecarboxylate, bis(3,4-epoxycyclohexyl) adipate, and tetradecane-1,14-dicarboxylic acid glycidyl ester.

Examples of the isocyanate employable herein include hexamethylene diisocyanate, 2,4-tolylene diisocyanate, 2,6-tolylene diisocyanate, xylylene diisocyanate, diphenylmethane diisocyanate, 1,5-naphthylene diisocyanate, isophorone diisocyanate, hydrogenated diphenylmethane diisocyanate, polyether modified by diisocyanate, polyester modified by diisocyanate, compound obtained by modifying polyvalent alcohol by bifunctional isocyanate, polyether modified by polyvalent isocyanate, polyester modified by polyvalent isocyanate, and mixture thereof.

Preferred among these molecular weight increasing agents are polyvalent carboxylic acids and metal complexes from the standpoint of safety and coloring properties and aliphatic compounds from the standpoint of biodegradability.

The amount of the molecular weight increasing agent to be incorporated depends on its kind but preferably is from 0.001 to 5 parts by weight, more preferably from 0.01 to 2 parts by weight based on 100 parts by weight of the total weight of the lactic acid-based polyester and the polyester consisting of dicarboxylic acid component(s) and diol component(s).

If the amount of the molecular weight increasing agent to be incorporated exceeds 5 parts by weight, the resulting lactic acid-based polyester composition disadvantageously undergoes gelation or coloring that causes a viscosity drop. On the contrary, if the amount of the molecular weight increasing agent to be incorporated falls below 0.001 part by weight, a sufficient effect of increasing molecular weight cannot be exerted.

The process for the preparation of the lactic acid-based polyester composition of the present invention will be described hereinafter.

Examples of the process for the preparation, of the lactic acid-based polyester composition of the present invention include a process which comprises the simultaneous melt-kneading of a lactic acid-based polyester (A), a polyester consisting of dicarboxylic acid component(s) and diol component(s) and a chelating agent and/or acidic phosphoric acid ester (C), a process which comprises the melt-kneading of a melt-kneaded mixture of a lactic acid-based polyester (A) and a polyester consisting of dicarboxylic acid component(s) and diol component(s) (B) with a chelating agent and/or acidic phosphoric acid ester (C), and a process which comprises melt-kneading either of a lactic acid-based polyester (A) or a polyester (B) consisting of dicarboxylic acid component(s) and diol component(s) with a chelating agent and/or acidic phosphoric acid ester (C), and then melt-kneading the resulting material with the remainder of said polyester (A) or said polyester (B), or comprises melt-kneading a lactic acid-based polyester (A) with a chelating agent and/or acidic phosphoric acid ester (C) and melt-kneading a polyester (B) consisting of dicarboxylic acid component(e) and diol component(s) with a chelating agent and/or acidic phosphoric acid ester (C), separately, and then melt-kneading the both resulting materials.

In particular, from the standpoint of quality, a process is desirable which comprises the melt-kneading of the melt-kneaded mixture of a lactic acid-based polyester (A) and a chelating agent and/or acidic phosphoric acid ester (C) with a polyester consisting of dicarboxylic acid component(s) and diol component(s) (B).

Alternatively, the lactic acid-based polyester composition can be prepared by the melt-kneading of the reaction product of a chelating agent and/or acidic phosphoric acid ester (C), preferably followed by devolatilization, with a polyester consisting of dicarboxylic acid component(s) and diol component(s) (B) in the final stage of synthesis of a lactic acid-based polyester.

The lactic acid-based polyester composition of the present invention can be prepared by the melt-kneading of a lactic acid-based polyester (A) and/or a polyester consisting of dicarboxylic acid component(s) and diol component(s) (B) with a molecular weight increasing agent (D) before or at the same time with the melt-kneading with a chelating agent and/or acidic phosphoric acid ester (C).

The ratio of the lactic acid-based polyester (A) to the polyester consisting of dicarboxylic acid component(s) and diol component(s) (B) in the lactic acid-based polyester composition is preferably from 99/1 to 10/90 by weight, particularly from 99/1 to 40/60 by weight for higher melting point.

In order to attain a high stiffness, the ratio (A)/(B) is preferably from 99/1 to 70/30 by weight. In order to attain an excellent flexibility, the ratio (A)/(B) is preferably from 70/30 to 40/60 by weight. The amount of the chelating agent and/or acidic phosphoric acid ester (C) to be incorporated is preferably from 0.001 to 5 parts by weight based on 100 parts by weight of the total weight of (A) and (B).

The kneading of the foregoing components must be conducted in such a manner that metal ions in the catalyst contained in the lactic acid-based polyester (A) or the polyester consisting of dicarboxylic acid component(s) and diol component(s) (B) and the chelating agent and/or acidic phosphoric acid ester (C) undergo thorough coordinate bonding with each other. To this end, these components shoud be kneaded at a temperature of from 130° C. to 250° C. for 1 to 60 minutes, preferably at a temperature of from 150° C. to 220° C. for 2 to 30 minutes.

The conditions under which the lactic acid-based polyester (A) and/or polyester consisting of dicarboxylic acid component(s) and diol component(s) (B) are kneaded with the molecular weight increasing agent (D) depend on the kind and amount of the lactic acid-based polyester, dicarboxylic acid component, diol component and molecular weight. increasing agent and thus are not specifically limited. However, the kneading temperature is preferably from 130° C. to 250° C. The kneading time is preferably from 1 minute to 60 minutes.

In order to add to the miscibility of these components, an ester interchange catalyst may be added. Examples of the ester interchange catalyst employable herein include known materials such as metal (e.g., tin, zinc, lead, titanium, bismuth, zirconium, germanium, cobalt) and compound thereof. Particularly preferred among these metal compounds are organic metal compounds, carbonates and halides.

In some detail, tin octanate, tin chloride, zinc chloride, zinc acetate, lead oxide, lead carbonate, titanium chloride, diacetoacetoxyoxy titanium, tetraethoxy titanium, tetrapropoxy titanium, tetrabutoxy titanium, germanium oxide, and zirconium oxide are preferred. The amount of such an ester interchange catalyst to be incorporated is preferably from 0.001 to 2 parts by weight, more preferably from 0.002 to 0.5 part by weight based on 100 parts by weight of the reaction components from the standpoint of reaction rate and coloring properties.

The esterification conditions depend on the kind and amount 6 of the ester interchange catalyst, lactic acid-based polyester, dicarboxylic acid component, diol component and molecular weight increasing agent (D) used and thus are not specifically limited. In some detail, the reaction temperature is preferably from 130° C. to 250° C. The reaction time is preferably as long as possible to allow the reaction to proceed thoroughly. In some detail, the reaction time is preferably from 1 to 10 hours from the standpoint of productivity.

In order to improve the thermal stability and storage stability of the lactic acid-based polyester composition of the present invention, it is preferred that the residual volatile components, particularly residual lactide, be devolatilized away from the composition under reduced pressure. The devolatilization is preferably effected after the melt-kneading of the chelating agent and/or acidic phosphoric acid ester to effectively reduce the residual volatile components.

In order to inhibit the decomposition or coloring of the polymer during kneading or devolatilization, the atmosphere in which kneading or devolatilization is effected is preferably an inert gas. In particular, kneading is preferably effected in an atmosphere of nitrogen or argon. Further, the lactic acid-based polyester, polyester consisting of dicarboxylic acid component(s) and diol component(s), chelating agent, acidic phosphoric acid ester, molecular weight increasing agent, etc. are preferably dried to remove water content therefrom before being kneaded.

The preparation of the lactic acid-based polyester composition may be effected in the presence of a solvent. The use of a solvent makes it possible to lower the viscosity of the resulting lactic acid-based polyester composition and hence minimize the local heat generation due to shearing heat during kneading, thereby minimizing coloring. Examples of the solvent employable herein include benzene, toluene, ethylbenzene, xylene, cyclohexanone, and isopropyl ether.

The lactic acid-based polyester composition thus obtained preferably has a molecular weight of more than a certain value. The optimum molecular weight of the lactic acid-based polyester composition greatly varies with the kind, combination, amount end kneading conditions of the lactic acid-based polyester, polyester consisting of dicarboxylic acid component(s) and diol component(s), chelating agent, acidic phosphoric acid ester, molecular weight increasing agent, etc. However, the weight-average molecular weight of the lactic acid-based polyester composition is preferably from 20,000 to 400,000, more preferably from 30,000 to 300,000 from the standpoint of quality and moldability. If the weight-average molecular weight of the lactic acid-based polyester composition falls below 20,000, satisfactory mechanical and physical properties cannot be obtained. On the contrary, if the weight-average molecular weight of the lactic acid-based polyester exceeds 400,000, it is undesired from the standpoint of moldability or productivity.

The molding process of the lactic acid-based polyester composition of the present invention will be described hereinafter.

Examples o the molding process of the composition of the present invention comprising a lactic acid-based polyester (A), a polyester consisting of dicarboxylic acid component(s) and diol component(s) (B) and a chelating agent and/or acidic phosphoric acid ester (C) include a process which comprises kneading a lactic acid-based polyester (A) and a polyester (B) consisting of dicarboxylic acid component(s) and diol component(s) with a chelating agent and/or acidic phosphoric acid ester (C), and then molding the material, a process which comprises melt-kneading a melt-kneaded mixture of a lactic acid-based polyester (A) and a polyester (B) consisting of dicarboxylic acid component(s) and diol component(s) with a chelating agent and/or acidic phosphoric acid ester (C), and then molding the material, a process which comprises kneading a lactic acid-based polyester (A) and a polyester consisting of dicarboxylic acid component(s) and diol component(s) (B) with a chelating agent and/or acidic phosphoric acid ester (C), or kneading a melt-kneaded mixture of a lactic acid-based polyester (A) and a polyester consisting of dicarboxylic acid component(s) and diol component(s) (b) with a chelating agent and/or acidic phosphoric acid ester (C), removing volatile components therefrom under reduced pressure, and then molding the material, a process which comprises melt-kneading a lactic acid-based polyester (A) with a chelating agent and/or acidic phosphoric acid ester (C), removing volatile components therefrom under reduced pressure, kneading the material with a polyester consisting of dicarboxylic acid component(s) and diol component(s) (B), and then molding the material, and the foregoing process wherein said lactic acid-based polyester (A) and/or polyester (B) consisting of dicarboxylic acid component(s) and diol component(s) is melt-kneaded with a molecular weight increasing agent (D) before or at the same time with the melt-kneading with said chelating agent and/or acidic phosphoric acid (C).

Various additives, polymers, fillers, etc. may be added to the system during the preparation, molding, etc. of the lactic acid-based polyester composition.

For example, as a viscosity modifier there may be kneaded a polyvalent alcohol such as trimethylolethane, trimethylolpropane, pentaerythritol and glycerin. Further, a polyester comprising a hydroxycarboxylic acid component other than lactic acid, cyclic ester, etc. may be added in an amount of from 1 to 50% by weight depending on purposes such as softening the lactic acid-based polyester composition and enhancing the mechanical strength and heat resistance of the lactic acid-based polyester composition.

These components are not specifically limited. Specific examples of the components which can be added include polyhydroxycarboxylic acid comprising 3-hydroxybutyric acid, 4-hydroxybutyric acid, 3-hydroxyvaleric acid, 4-hydroxyvaleric acid, 5-hydroxyvaleric acid, glycolic acid, dimethylglycolic acid, β-hydroxypropanic acid, α-hydroxybutyric acid, α-hydroxycaproic acid, β-hydroxycaproic acid, γ-hydroxycaproic acid, δ-hydroxycaproic acid, δ-hydroxymethylcaproic acid, ε-hydroxycaproic acid, ε-hydroxymethylcaproic acid, etc., polymer of cyclic ester such as glycolide, ε-caprolactone, γ-valerolactone, γ-undecalactone, β-methyl-δ-valerolactone and meso-lactide, and mixture of copolymer thereof.

Further, the lactic acid-based polyester composition of the present invention can be thoroughly plasticized as it is and thus can be easily molded. If it is desired to render the lactic acid-based polyester composition highly fluid or flexible, the lactic acid-based polyester composition may comprise a plasticizer such as diethyl succinate, dibutyl succinate, dioctyl adipate, diethyl sebacate, dibutyl sebacate, dioctyl sebacate, dibutyl sebacate, dibutyl azelate, trioctyl trimellitate, diethyl phthalate, dioctyl phthalate, polypropylene glycol adipate and butanediol adipate incorporated therein.

Particularly preferred among these plasticizers is an adipic acid-based polyester plasticizer because of its great effect of improving the fluidity or flexibility. In particular, an adipic acid-based polyester plasticizer having a weight-average molecular weight of not more than 20,000 terminated by alcohol or the like is preferred because of its good stability during molding.

The amount of such a plasticizer to be used is not specifically limited. For the purpose of avoiding a phenomenon in which excess plasticizer is eluted from the polymer, i.e., bleeding, the plasticizer is preferably incorporated in an amount of from 1 to 40% based on the weight of the lactic acid-based polyester composition. A plasticizer which has a high softening point and normally stays solid tends to be subject to little bleeding.

The lactic acid-based polyester composition of the present invention may further comprise a metallic soap such as zinc stearate, magnesium stearate, calcium stearate, barium stearate and sodium palmitate, and lubricant such as mineral oil, liquid paraffin, stearic acid and ethylene-bis-stearamide incorporated therein.

Further, surface active agents such as anionic surface active agent (e.g., carboxylate, sulfonate, sulfuric acid ester, phosphoric acid ester), a cationic surface active agent (e.g., aliphatic amine salt, aliphatic quaternary ammonium salt, aromatic ammonium salt, heterocyclic ammonium salt), an amphoteric surface active agent (e.g., betaine, aminocarboxylate, imidazoline derivatives), a nonionic surface active agent (e.g., ether type surface active agent such as alkylether, alkylallyl polyalkyleneether and polyoxyethylene polyoxypropyl alkyl ether, ether ester type surface active agent such as glycerol ester polyoxythylene ether and sorbitan ester polyoxyethylene ether, ester type surface active agent such as polyethylene glycol fatty acid ester, glycerin ester, propylene glycol ester and sucrose fatty acid ester, and nitrogen-containing type surface active agent such as aliphatic alkanolamide, polyoxyethylene fatty acid amide, polyoxyethylene alkylamine and amine oxide) may be added.

The amount of the lubricant or surface active agent to be incorporated is preferably from 0.01 to 5 parts by weight based on 100 parts by weight of the lactic acid-based polyester composition.

In order to enhance the heat resistance and stiffness of the lactic acid-based polyester, the lactic acid-based polyester composition may comprise an ordinary filler such as inorganic filler (e.g., talc, calcium carbonate, silica, clay, diatomaceous earth, perlite) and organic filler (e.g., wood flour, starch, cellulose, cellulose derivatives) incorporated therein. The amount of the filler to be added is net specifically limited. The filler is preferably added in an amount of from 1 to 50 parts by weight based on 100 parts by weight of the lactic acid-based polyester composition.

Further, an antioxidant, thermal stabilizer, ultraviolet absorber, antistatic agent, flame retardant, wax, crystallization accelerator or the like may be added to the polymer during the kneading process or the like. The amount of such an additive to be added is preferably from 0.01 to 5 parts by weight based on 100 parts by weight of the lactic acid-based polyester composition. Specific examples of the antioxidant include 2,6-di-t-butyl-p-cresol, butylated hydroxyanisole, 2,6-di-tert-butyl-4-ethylphenol, distearyl-3,3'-thiodipropionate, and dilauryl-3,3'-thiodipropionate. Specific examples of the thermal stabilizer include triphenyl phosphite, trilauryl phosphite, and trisnonylphenyl phosphite. Specific examples of the ultraviolet absorber include p-t-butylphenyl salicylate, 2-hydroxy-4-methoxybenzophenone, 2-hydroxy-4-methoxy-2'-carboxybenzophenone, and 2,4,5-trihydroxybutyrophenone. Specific examples of the antistatic agent include N,N-bis (hydroxyethyl)alkylamine, alkyl amine, alkyl allyl sulfonate, and alkyl sulfonate. Specific examples of the flame retardant include hexabromocyclododecane, tris-(2,3-dichloropropyl)phosphate, and pentabromophenylallyl ether. Further, a colorant 20 titanium oxide and carbon black, or the like may be incorporated in the lactic acid-based polyester composition.

The apparatus for the preparation of the lactic acid-based polyester composition employable herein will be described hereinafter.

The apparatus for the preparation of the lactic acid-based polyester composition of the present invention is not specifically limited. In order to knead the lactic acid-based polyester, polyester consisting of dicarboxylic acid component(s) and diol component(s), chelating agent and/or acidic phosphoric acid ester, molecular weight increasing agent, etc., an extruder, kneader, reactor or the like may be used.

As the extruder there may be used a single screw extruder or twin-screw extruder. The twin-screw extruder is preferred from the standpoint of kneading capacity. Further, the extruder is preferably vented to remove the residual volatile components under reduced pressure immediately after kneading. The vent preferably the a large opening area. A plurality of, particularly 2 to 5, such vents are preferably provided to reduce the volatile content. As the kneader thee may be used a batch or continuous kneader.

As the reactor there may be used an ordinary reaction vessel. Since the substance to be kneaded has a high viscosity that causes a stirring heat by shearing stress in stirring that in turn causes a molecular weight drop or coloring, a static mixer which can provide uniform mixing at a small shearing force is preferably used.

In some detail, the kneading of the foregoing components is preferably effected at a temperature of from 130° C. to 250° C. under a pressure of from 0.01 to 50 torr to remove residual volatile components, particularly residual lactide, from the lactic acid-based polyester composition.

These components are preferably kneaded in the kneading machine in an atmosphere of inert gas without being brought into contact with the external atmosphere.

As the devolatilizing apparatus for removing volatile components, solvent and malodorous components from the lactic acid-based polyester composition there may be preferably used a vessel type devolatilizer, thin film type devolatilizer or vented extruder, particularly vented biaxial extruder. With such a devolatilizing apparatus, the lactic acid-based polyester composition is preferably continuously devolatilized and pelletized. Thus, these devolatizing apparatus are recommendable.

Examples of the vessel type devolatilizer employable herein include those disclosed in JP-A-59-166506, JP-A-61-228012, and JP-A-2-209902. In some detail, the vessel type devolatilizer preferably comprises a vertical shell-and-tube heat exchanger and a devolatilizing tank. In this arrangement, the vertical shell-and-tube heat exchanger for heating the reaction solution taken out from the kneading process is preferably provided on the devolatilizing tank so that the reaction solution which has passed through the heat exchanger immediately flows down through the devolatilizing tank while being foamed. Two of such an apparatus are preferably connected in series with each other to provide an enhanced devolatilizing efficiency.

The thin film type devolatilizer is preferably equipped with a cylindrical vertical external wall, an agitator blade provided thereinside for pressing a liquid material against the wall surface and a mechanism provided in the lower zone for taking out the reaction solution processed out of the apparatus. Further, the lactic acid-based polyester composition may be devolatilized under reduced pressure on heating in a drier or fluid drier.

Referring further to the conditions of devolatilization by the devolatilizing apparatus, in order to effectively remove volatile components from the lactic acid-based polyester composition or inhibit the re-generation of lactide from the lactic acid-based polyester composition, the drop of the molecular weight of the lactic acid-based polyester composition and the coloring of the lactic acid-based polyester composition, the devolatilization is preferably effected at a temperature of from 130° C. to 250° C., more preferably from 150° C. to 220° C., under a pressure of from 0.1 to 50 torr, preferably from 0.1 to 30 torr, more preferably from 0.1 to 20 torr, for from 0.5 to 30 minutes, preferably from 0.5 to 15 minutes, more preferably from 0.5 to 5 minutes.

Referring to the conditions of devolatilization by a drier, the devolatilization is preferably effected at a temperature of from 60° C. to 240° C. under a pressure of from 0.1 to 50 torr for 5 to 400 minutes to inhibit the drop of the molecular weight of the pelletized or crushed product of the hydroxycarboxylic acid-based polyester composition thus obtained.

The devolatilization is preferably effected in an atmosphere of inert gas without causing the material to be brought into contact with the external atmosphere. Under these devolatilizing conditions, the content of residual lactide in the lactic acid-based polyester composition, which is normally from 2% to 5% by weight, can be reduced to not more than 1.0% by weight, optionally to not more than 0.1% by weight.

The chelating agent and/or acidic phosphoric acid ester and the molecular weight increasing agent may be supplied into a kneading machine or devolatilizing apparatus at a feed line provided therein during the kneading or devolatilization of the lactic acid-based polyester or polyester consisting of dicarboxylic acid component(s) and diol component(s).

Other examples of the method for eliminating the residual volatile components include a reprecipitation method which comprises dissolving the lactic acid-based polyester composition in a solvent, and then adding the solution to a poor solvent. Examples of the solvent for dissolving the lactic acid-based polyester composition therein include benzene, toluene, ethylbenzene, xylene, cylohexanone, methyl ethyl ketone, methyl isobutyl ketone, tetrahydrofuran, dioxane, methyl isobutyl ketone, methyl ethyl ketone, isopropylether, dichloromethane, chloroform, carbon tetrachloride, chlorobenzene, dichlorobenzene, trichlorobenzene, chloronaphthalene, and mixture thereof. Examples of the poor solvent include water, methanol, ethanol, propanol, butanol, pentane, hexane, heptane, octane, nonane, decane, diethylether, and mixture thereof.

The reprecipitation process is preferably effected by a process which comprises dissolving the lactic acid-based polyester composition in a solvent at a concentration of from 2 to 20% by weight at room temperature or an elevated temperature, gradually adding the solution to a poor solvent in an amount of twice to 15 times that of the solution with stirring, and then allowing the solution to stand for 10 to 180 minutes to effect precipitation. The residual solvent or volatile components are then removed from the precipitate thus obtained under reduced pressure and/or heating.

In accordance with this process for the removal of lactide, the content of residual lactide in the lactic acid-based polyester composition, which is normally from about 2 to 5% by weight, can be reduced to not more than 1.0% optionally to not more than 0.1%.

As another method for eliminating the residual volatile components there may be used a solvent cleaning method which comprises adding the lactic acid-based polyester composition to a poor solvent for polymer capable of dissolving the volatile components therein to remove the volatile components from the composition. Examples of the solvent for cleaning the lactic acid-based polyester composition include propyl acetate, butyl acetate, methyl butyrate, ethyl butyrate, cyclohexanone, methyl ethyl ketone, methyl isobutyl ketone, methyl ethyl ketone, isopropyl ether, methanol, ethanol, propanol, butanol, diethylether, and mixture thereof.

The cleaning process is preferably effected by a process which comprises adding the lactic acid-based polyester composition to the solvent in an amount of from 2 to 80 parts by weight based on 100 parts by weight of the solvent at room temperature or under cooling or heating, stirring the mixture for 2 to 15 minutes, taking out the polymer thus precipitated, and then drying the polymer under reduced pressure and/or heating.

For the molding of a melt-kneaded mixture of the lactic acid-based polyester, polyester consisting of dicarboxylic acid component(s) and diol component(s), chelating agent, acidic phosphoric acid ester, molecular weight increasing agent, etc., an ordinary molding machine, particularly a molding machine used for thermoplastics, may be used.

Specific examples of such an ordinary molding machine include film extruder, sheet extruder, contour extruder, inflation molding machine, foamed sheet extruder, injection molding machine, injection blow molding machine, and direct blow molding machine. The molding conditions depends on the molecular weight, composition ratio, and molding process of a mixture or melt-kneaded mixture of the lactic acid-based polyester, polyester consisting of dicarboxylic acid component(s) and diol component(s), chelating agent, acidic phosphoric acid ester, etc. The molding temperature is from 110° C. to 250° C., preferably from 120° C. to 220° C. If the molding is accompanied by devolatilization, the pressure is preferably from 0.01 to 50 torr.

The preparation process of the present invention can provide various lactic acid-based polyester compositions having different properties ranging from high hardness to high flexibility. The lactic acid-based polyester composition obtained according to the present invention has an excellent heat resistance and storage stability. The lactic acid-based polyester composition of the present invention further has a tensile elastic modulus of from 500 to 50,000 kg/cm$^2$. Therefore, the lactic acid-based polyester composition of the present invention can be widely used as a packaging material such as sheet and film which is normally made of general-purpose polymer and various material such as foaming material, extrusion molding material, injection molding material, blow molding material, material used for ink and material used for lamination.

The lactic acid-based polyester composition obtained according to the present invention also has a good biodegradability. Therefore, when discarded after used as a packaging material, foaming material, extrusion molding material, injection molding material, blow molding material, material used for ink, material used for lamination of the like or discarded during the preparation process, the lactic acid-based polyester composition helps reduce the weight of waste. In particular, when discarded in the sea, the lactic acid-based polyester composition of the present invention is subject to hydrolysis and biodegradation. In the sea water, the polymer shows a strength deterioration in one or two years and undergoes decomposition to an extent such that its original shape is destroyed.

Further, the lactic acid-based polyester composition of the present invention has a less residual lactide and hence an excellent thermal stability and storage stability. Thus, the lactic acid-based polyester composition or the present invention is less subject to polymer decomposition during molding. Thus, the lactic acid-based polyester composition of the present invention has an excellent moldability. Accordingly, the lactic acid-based polyester of the present invention can be molded by various methods such as extrusion molding, injection molding, blow molding, inflation molding, lamination molding and press molding using an existing apparatus used for general-purpose resin. The resulting molded products can be subjected to secondary molding such as printing, plating and vacuum metallizing. The molded products, if in the form of film or sheet, can be subjected to secondary molding such as bag-forming, vacuum forming and pressure forming.

Because of its excellent properties, the lactic acid-based polyester composition obtained according to the present invention can be used as a packaging material such as tray, foamed tray, stretched film, shrink film, drink bottle and blister for toothbrush, an agricultural and gardening material such as film for green house, tunnel film, mulch film, vegetation sheet, seedling pot, string containing seed and fertilizer and agricultural chemical covering agent, a civil engineering material such as vegetation net made of flat yarn, heavy-duty bag, molding for construction, sheet and lawn-stopping pile, a fishing material such as fishing net, layer-farming net, fishing line and fishing bait bag, sanitary goods such as paper diaper, sanitary goods packaging material and syringe, daily and sundry goods such as dust bag, vinyl bag, polyethylene bag, dish drainer net, binding tape, IC card, magnetic card, recording card, guarantee card, pen, marker, label, releasing paper, golf tee, grip of disposable razor, disposable dish, disposable spoon, disposable folk, paper lamination container, cosmetic bottle, shampoo bottle, rinse bottle, book cover and OHP film, a medical material such as joint material for bones, DDS material, stitching fiber and wound covering material, a releasing material or repellent or anti-fungus agent, a water-retaining sheet, air-cleaning filter, vegetation sheet, tunnel sheet and weedkilling bag made of nonwoven fabric cloth, and various cushioning materials.

The present invention will be further described in the following examples and comparative examples. The part(s) as used herein is by weight unless otherwise defined. The molecular weight, residual lactide content, melting point, thermal stability, storage stability and biodegradability were measured by the following methods:

The molecular weight is measured by gel permeation chromatography (GPC) as calculated in terms of polystyrene. The residual lactide content was measured by high speed liquid chromatography. For the measurement of the melting point, a differential scanning type calorimeter DSC-200 available from Seiko Corp. The measurement of melting point was effected at a temperature rising rate of 10° C./min. The melting point was determined from the resulting melting-endothermal curve.

For the measurement of the thermal stability, a 250-μm thick sheet specimen was allowed to stand at a temperature of 220° C. under a reduced pressure of 5 torr for 10 minutes. The drop of weight and molecular weight was determined to evaluate the thermal stability. For the measurement of storage stability, a 250-μm thick sheet specimen was allowed to stand at a temperature of 23° C. and a humidity of 50% for 3 months. The drop of molecular weight was determined to evaluate storage stability.

For the biodegradability test, Type 100 Tombo Miracle Compo (100-1 composting container available from Shinki Gosei K.K.) was used. 50 kg of garbage from the kitchen was put in the composting container. A 10 cm×10 cm sheet specimen was then put on the garbage. Garbage was then accumulated on the specimen to a thickness of about 5 cm. The garbage was then sprinkled with 500 g of Newkusaminon (compost accelerant available from Aron Kasei Co., Ltd.). The arrangement was installed outdoors. After 1 month, the specimen was taken out. As a result, the specimen was found ragged to an extent such that the original shape was destroyed all in the examples and comparative examples.

EXAMPLE 1

70 parts of a polylactic acid (L-lactide/D-lactide=98/2; weight-average molecular weight: 196,000), 30 parts of an aromatic polyester (terephthalic acid: 25 mol-%; isophthalic acid: 25 mol-%; ethylene glycol: 20 mol-%; neopentyl glycol: 30 mol-%; weight-average molecular weight: 55,400) and 0.2 part of tartaric acid were mixed. The mixture was supplied into a vented biaxial extruder which had been adjusted to a temperature of 180° C. where it was then devolatilized and pelletized under a pressure of 5 torr while being melt-kneaded.

The lactic acid-based polyester composition thus obtained showed a weight-average molecular weight of 141,000. The lactic acid-based polyester composition apparently looked colorless and transparent and was almost odorless. The lactic acid-based polyester composition had a residual lactide content of 0.2%. Further, the lactic acid-based polyester composition showed a melting point of 163° C., a drop of 1% and 2% in the weight and molecular weight, respectively, after thermal stability test and a molecular weight drop of 2% after storage stability test. Thus, the lactic acid-based polyester composition thus obtained showed an excellent stability.

EXAMPLE 2

90 parts of a lactic acid-based polyester L-lactide/D-lactide/glycolide=93/2/5; weight-average molecular weight: 189,000), 10 parts of an aliphatic polyester (sebasic acid 50 mol-%; propylene glycol, 50 mol-%; weight-average molecular weight: 38,000) and 0.2 part of a mixture of mono-2-ethylhexyl phosphate and di-2-ethylhexyl phosphate were mixed. The mixture was supplied into a vented biaxial extruder which had been adjusted to a temperature of 180° C. where it was then devolatilized and pelletized under a pressure of 5 torr while being melt-kneaded. The lactic acid-based polyester composition thus obtained showed a weight-average molecular weight of 158,000.

The lactic acid-based polyester composition apparently looked colorless and transparent and was almost odorless. The lactic acid-based polyester composition had a residual lactide content of 0.1%. Further, the latic acid-based polyester composition showed a melting point of 163° C., a drop of 1% end not more than 1% in the weight and molecular weight, respectively, after thermal stability test and a molecular weight drop of 1% after storage stability test. Thus, the lactic acid-based polyester composition thus obtained showed a very excellent stability.

EXAMPLE 3

80 parts of a poly-L-lactic acid (weight-average molecular weight: 203,000), 10 parts of a poly-D,L,-lactic acid (weight-average molecular weight: 185,000), 10 parts of an aliphatic polyester (sebasic acids 49 mol-%; anhydrous pyromellitic acid: 1 mol-%; polypropylene glycol having a molecular weight of 1,000: 40 mol-%; propylene glycol: 10 mol-%; weight-average molecular weights 113,000), 0.4 part of ethylenediaminetetraacetic acid, and 0.1 part of triphenyl phosphite were mixed. The mixture was supplied into a vented biaxial extruder which had been adjusted to a temperature of 180° C. where it was then devolatilized and pelletized under a pressure of 5 torr while being melt-kneaded. The lactic acid-based polyester composition thus obtained showed a weight-average molecular weight of 171,000. The lactic acid-based polyester composition apparently looked light-yellowish and transparent and was almost odorless. The lactic acid-based polyester composition had a residual lactide content of not more than 0.1%. Further, the lactic acid-based polyester composition showed a melting point of 165° C., a drop of 1% and not more than 1% in the weight and molecular weight, respectively, after thermal stability test and a molecular weight drop of 1% after storage stability test. Thus, the lactic acid-based polyester composition thus obtained showed a very excellent stability.

EXAMPLE 4

90 parts of a poly-L-lactic acid (weight-average molecular weight: 203,000), 10 parts of an aliphatic: polyester (methylsuccinic acid: 49 mol-%; maleic anhydride 1 mol-%; dipolypropylene glycol components: 50 mol-%; weight-average molecular weight: 43,000), and 0.2 part of pyrophosphoric acid were mixed. The mixture was supplied into a vented biaxial extruder which had been adjusted to a temperature of 180° C. where it was then devolatilized and pelletized under a pressure of 5 torr while being melt-kneaded.

The lactic acid-based polyester composition thus obtained showed a weight-average molecular weight of 167,000. The lactic acid-based polyester composition apparently looked colorless and transparent and was almost odorless. The lactic acid-based polyester composition had a residual lactide content of 0.3%. Further, the lactic acid-based polyester composition showed a melting point of 170° C., a drop of 2% and 1% in the weight and molecular weight,

EXAMPLE 5

70 parts of a poly-L-lactic acid (weight-average molecular weight: 203,000), 10 parts of Placcel H-7 (available from Dicel Chemical Industries, Ltd.), 20 parts of an aliphatic polyester (sebasic acids 50 mol-%; 1,4-butanediol: 50-mol %; weight-average molecular weight: 46,000), 0.4 part of ethylenediaminetetraacetic acid, and 0.2 part of a mixture of monooctadecyl phosphate and dioctadecyl phosphate were mixed. The mixture was supplied into a vented biaxial extruder which had been adjusted to a temperature of 180° C. where it was then devolatilized and pelletized under a pressure of 5 torr while being melt-kneaded.

The lactic acid-based polyester composition thus obtained showed a weight-average molecular weight of 144,000, The lactic acid-based polyester composition apparently looked colorless and was almost odorless. The lactic acid-based polyester composition had a residual lactide contempt of 0.1%. Further, the lactic acid-based polyester composition showed a melting point of 162° C., a drop of 1% and not more than 1% in the weight and molecular weight, respectively, after thermal stability test and a molecular weight drop of 1% after storage stability test. Thus, the lactic acid-based polyester composition thus obtained showed a very excellent stability.

EXAMPLE 6

82 parts of a poly-L-lactic acid (weight-average molecular weight: 203,000), 18 parts of a poly-D,L-lactic acid (weight-average molecular weight: 185,000), and 0.2 part of a mixture of monostearyl phosphate and distearyl phosphate were mixed. The mixture was supplied into a vented biaxial extruder which had been adjusted to a temperature of 180° C. where it was then devolatilized under a pressure of 5 torr while being melt-kneaded to obtain a pellet P1.

Separately, 100 parts of an aliphatic polyester (azelaic acid: 50 mol-%; tripropylene glycol: 35 mol-%; ethylene glycol: 15 mol-%; weight-average molecular weight: 41,000) and 0.4 part of ethylenediaminetetraacetic acid were kneaded in a reactor which had been adjusted to a temperature of 180° C. for 30 minutes to obtain a mixture L1.

P1 and L1 were supplied through a feeder into a vented biaxial extruder which had been adjusted to a temperature of 180° C. in such a manner that P1/L1 was 92/8. Under these conditions, the mixture was devolatilized under a pressure of 5 torr while being melt-kneaded to obtain a lactic acid-based polyester composition in the form of pellet. The lactic acid-based polyester composition thus obtained showed a weight-average molecular weight of 176,000. The lactic acid-based polyester composition apparently looked light-yellowish and transparent and was almost odorless. The lactic acid-based polyester composition had a residual lactide content of not more than 0.1%. Further, the lactic acid-based polyester composition showed a melting point of 166° C., a drop of not more than 1% each in the weight and molecular weight after thermal stability test and a molecular weight drop of not more than 1% after storage stability test. Thus, the lactic acid-based polyester composition thus obtained showed a very excellent stability.

EXAMPLE 7

97 parts of a poly-L-lactic acid (weight-average molecular weight: 203,000), 3 parts of a poly-D-lactic acid (weight-average molecular weights 192,000, and 0.2 part of a mixture of monohexadecyl phosphate and dihexadecyl phosphate were supplied through a feeder into a vented biaxial extruder which had been adjusted to a temperature of 180° C. Under these conditions, the mixture was devolatilized and pelletized under a pressure of 5 torr while being melt-kneaded.

60 parts of the pellet thus obtained and 40 parts of an aliphatic polyester (dodecanedicarboxylic acid: 50-mol %; 1,6-hexanediol: 50-mol %; weight-average molecular weight: 44,000) were then supplied to a vented biaxial extruder which had been adjusted to a temperature of 18° C. Under these conditions, the mixture was devolatilized while being melt-kneaded to obtain a lactic acid-based polyester composition in the form of pellet.

The lactic acid-based polyester composition thus obtained showed a weight-average molecular weight, of 140,000. The lactic acid-based polyester composition apparently looked colorless and was almost odorless. The lactic acid-based polyester composition had a residual lactide content of not more than 0.1%. Further, the lactic acid-based polyester composition showed a melting point of 164° C. a drop of not more than 1% each in the weight and molecular weight after thermal stability test and a molecular weight drop of not more than 1% after storage stability test. Thus, the lactic acid-based polyester composition thus obtained showed a very excellent stability.

EXAMPLE 8

100 parts of an aliphatic polyester (succinic acid: 49.8 mol-%; 1,2,3,4-butanetetracarboxylic acid: 0.2 mol-%; 1,4-butanediol, 50-mol %; weight-average molecular weight: 125,000), 0.2 part of citric acid, and 0,2 part of a mixture of mono-2-ethylhexyl phosphate and di-2-ethylhexyl phosphate were blended. The blend was supplied into a vented biaxial extruder which had been adjusted to a temperature of 130° C., melt-kneaded, and then pelletized.

35 parts of the pellet thus obtained, 60 parts of a poly-L-lactic acid (weight-average molecular weight: 203,000), and 5 parts of a poly-D,L-lactic acid (weight-average molecular weight: 185,000) were mixed. The mixture was then supplied into a vented biaxial extruder which had been adjusted to a temperature of 180° C. Under these conditions, the mixture was devolatilized under a pressure of 5 torr while being melt-kneaded to obtain a lactic acid-based polyester composition on in the form of pellet.

The lactic acid-based polyester composition thus obtained showed a weight-average molecular weight of 157,000. The lactic acid-based polyester composition apparently looked colorless and was almost odorless. The lactic acid-based polyester composition had a residual lactide content of 0.1%. Further, the lactic acid-based polyester composition showed a melting point of 165° C., a drop of 1% each in the weight and molecular weight after thermal stability test and a molecular weight drop of not more than 1% after storage stability test. Thus, the lactic acid-based polyester composition thus obtained showed a very excellent stability.

EXAMPLE 9

100 parts of an aliphatic polyester (sebacic acid: 50 mol-%; propylene glycol: 50 mol-%; weight-average molecular weights 38,000) and 0.2 part of triethylenetetramine hexaacetic acid were kneaded in a reactor which had been adjusted to a temperature of 180° C. for 30 minutes to obtain a mixture L2. 10 parts of L2 and 90 parts of a polylactic acid (L-lactide/D-lactide=98/2; weight-average molecular weight: 196,000) were supplied through a feeder into a vented biaxial extruder which had been adjusted to a temperature of 180° C. Under these conditions, the mixture was devolatilized under a pressure of 5 torr while being melt-kneaded to obtain a lactic acid-based polyester in the form of pellet.

The lactic acid-based polyester composition thus obtained showed a weight-average molecular weight of 162,000.

The lactic acid-based polyester composition apparently looked light-yellowish and transparent and was almost odorless. The lactic acid-based polyester composition had a residual lactide content of not more than 0.1%. Further, the lactic acid-based polyester composition showed a melting point of 168° C., a drop of 1% each in the weight and molecular weight after thermal stability test and a molecular weight drop of 1% after storage stability test. Thus, the lactic acid-based polyester composition thus obtained showed an excellent stability.

EXAMPLE 10

92 parts of a poly-L-lactic acid (weight-average molecular weight: 203,000), 8 parts of a poly-D,L-lactic acid (weight-average molecular weight: 185,000), and 0.2 part of a mixture of monolauryl phosphate and dilauryl phosphate were mixed, and then supplied into a vented biaxial extruder which had been adjusted to a temperature of 180° C. Under these conditions, the mixture was devolatilized and pelletized under a pressure of 5 torr while being melt-kneaded.

80 parts of the pellet thus obtained and 20 parts of an aliphatic polyester (dodecanedicarboxylic acids 40-mol %; adipic acid: 10 mol-%; 1,6-hexanediol: 50-mol %; weight-average average molecular weight: 45,000) were then extruded through a tetravented biaxial extruder having L/D of 30 and a cylinder diameter of 50 mm while being devolatilized to obtain a 1.0-mm thick odorless sheet having good surface conditions.

The extrusion was effected at a cylinder temperature of 170° C, a screw rotary speed of 20 rpm and an output of 5 kg/hr under a venting pressure of 1 torr. The sheet thus obtained had a weight-average molecular weight of 155,000. The sheet showed a residual lactide content of not more than 0.1% and a melting point of 165° C. The sheet showed a drop of not more than 1% each in the weight and molecular weight after thermal stability test and a molecular weight, drop of not more than 1% after storage stability test. Thus, the sheet thus obtained showed an extremely excellent stability.

EXAMPLE 11

90 parts of a polylactic acid (L-lactic acid/D-lactic acid= 98/2; weight-average molecular weight, 122,000), 10 parts of an aliphatic polyester (sebacic acid: 50 mol-%; polypropylene glycol: 45 mol-%; propylene glycol: 5 mol-%; weight-average molecular weight, 43,000), and 0.5 part of aluminum isopropoxide were supplied through a feeder into a vented biaxial extruder which had been adjusted to a temperature of 180° C., melt-kneaded, and then pelletized.

100 parts of the pellet thus obtained and 0.2 part of a mixture of monostearyl phosphate and distearyl phosphate were dry-blended, and then supplied into a vented biaxial extruder which had been adjusted to a temperature of 180° C. Under these conditions, the mixture was devolatilized and pelletized under a pressure of 2 torr while being melt-kneaded. The lactic acid-based polyester composition thus obtained had a weight-average molecular weight of 114,000.

The lactic acid-based polyester composition thus obtained apparently looked light-yellowish and transparent and was almost odorless. The lactic acid-based polyester composition showed a residual lactide content of not more than 0.1% and a melting point of 164° C. The lactic acid-based polyester composition showed a drop of not more than 1% each in the weight and molecular weight after thermal stability test and a molecular weight drop of not more than 1% after storage stability test. Thus, the lactic acid-based polyester composition thus obtained showed a very excellent stability.

EXAMPLE 12

35 parts of an aliphatic polyester (succinic acid: 50 mol-%; 1,4-butanediol: 50 mol-%; weight-average molecular weight: 45,000), and 0.5 part of trimellitic anhydride were dry-blended, supplied into a vented biaxial extruder which had been adjusted to a temperature of 80° C., melt-kneaded, and then pelletized.

35 parts of the pellet thus obtained were bended with 55 parts of a poly-L-lactic acid (weight-average molecular weight: 203,000), 10 parts of a poly-D,L-lactic acid (weight-average molecular weight: 185,000) and 0.2 part of a mixture of mono-2-ethylhexyl phosphate and di-2-ethylhexyl phosphate. The blend was supplied into a vented biaxial extruder which had been adjusted to a temperature of 180° C. Under these conditions, the blend was devolatilized and pelletized under a pressure of 2 torr whale being melt-kneaded.

The lactic acid-based polyester composition thus obtained had a weight-average molecular weight of 160,000. The lactic acid-based polyester composition thus obtained apparently looked light-yellowish and was almost odorless. The lactic acid-based polyester composition showed a residual lactide content of not more than 0.1% and a melting point of 168° C. The lactic acid-based polyester composition showed a drop of not more than 1% each in the weight and molecular weight after thermal stability test and a molecular weight drop of not more than 1% after storage stability test. Thus, the lactic acid-based polyester composition thus obtained showed a very excellent stability.

EXAMPLE 13

To a mixture of 75 parts of a poly-L-lactic acid (weight-average molecular weight: 203,000), 5 parts of a poly-D,L-lactic acid (weight-average molecular weight: 185,000), 20 parts of an aliphatic polyester (sebacic acid: 50 mol-%; propylene glycol: 50 mol-%; weight-average molecular weight: 38,000) and 0.2 part of hexamethylene diisocyanate were added 8 parts of toluene as a solvent. The mixture was then melt-kneaded at a temperature of 130° C. in an atmosphere of inert gas for 1 hour. To the mixture were then added 0.03 part of tin octanate as an ester interchange catalyst. The mixture was then kneaded at a temperature of 170° C. for 5 hours. To the mixture were then added 0.3 part of citric acid and 0.1 part of triphenyl phosphite. The mixture was kneaded for 3 hours, cooled, and then pelletized.

The pellet thus obtained was dispersed in methanol at room temperature. The dispersion was then stirred. The dispersion was then subjected to separation. The component thus separated was then dried to remove volatile components therefrom. The lactic acid-based polyester composition thus obtained had a weight-average molecular weight of 176,000. The lactic acid-based polyester composition apparently looked colorless and transparent and was almost odorless.

The lactic acid-based polyester composition showed a residual lactide content of not more than 0.1%. The lactic acid-based polyester composition showed a drop of 1% each in the weight and molecular weight after thermal stability test and a molecular weight drop of 1% after storage stability test. Thus, the lactic acid-based polyester composition thus obtained showed an excellent stability.

EXAMPLE 14

To 30 parts of an aliphatic polyester (dodecanedicarboxylic acid: 40-mol %; adipic acid: 10 mol-%; 1,6-hexanediol: 50-mol %; weight-average molecular weight: 45,000) were added 0.15 part of pyromellitic anhydride. The reaction mixture was then allowed to undergo reaction at a temperature of 200° C. for 3 hours to obtain a polyester having a weight-average molecular weights 125,000. To the polyester were then added 64 parts of a poly-L-lactic acid (weight-average molecular weight: 203,000) and 6 parts of a poly-D,L-lactic acid (weight-average molecular weight: 185,000). The mixture was then melt-kneaded in an inert gas-substituted atmosphere at a temperature of 165° C. for 1 hour. To the melt-kneaded mixture were then added 0.03 part of tin octanate as an ester interchange catalyst. The mixture was then kneaded at a temperature of 170° C. for 5 hours.

Thereafter, to the material were added 0.2 part of triethylenetetraminehexaacetic acid and 0.2 part of monostearyl phosphate. The mixture was kneaded for 20 minutes, pelletized, and then taken out. The pelletized lactic acid-based polyester composition thus obtained showed a weight-average molecular weight of 165,000 and a residual lactide content of 4.2%. The pellet was absolutely dried, and then extruded through a tetravented single-screw extruder having L/D of 30 and an extrusion screw diameter of 50 mm to obtain a 1.0-mm thick sheet having good surface conditions giving little odor.

The extrusion was effected at a cylinder temperature of 170° C., a screw rotary speed of 20 rpm and an output of 5 kg/hr under a venting pressure of 1 torr. The sheet thus obtained had a weight-average molecular weight of 157,000. The sheet showed a residual lactide content of 0.1% and a melting point of 159° C. The sheet showed a drop of not more than 1% each in the weight and molecular weight after thermal stability test and a molecular weight drop of not more than 1% after storage stability test.

COMPARATIVE EXAMPLE 1

The procedure of Example 1 was followed to obtain a pelletized lactic acid-based polyester composition except that tartaric acid was not used. The pelletized lactic acid-based polyester composition thus obtained showed a weight-average molecular weight of 106,000. The pelletized lactic acid-based polyester composition apparently looked brown and transparent and gave a strong scent. The lactic acid-based polyester composition showed a residual lactide content of 3.2%. The lactic acid-based polyester composition had a melting point of 156° C. Further, the lactic acid-based polyester composition showed a drop of 11% and 9% in the weight and molecular weight, respectively, after thermal stability test and a molecular weight drop of 14% after storage stability test. Thus, the lactic acid-based polyester composition thus obtained showed a poor stability.

COMPARATIVE EXAMPLE 2

The procedure of Example 2 was followed to obtain a pelletized lactic acid-based polyester composition except that the mixture of mono-2-ethylhexyl phosphate and di-2-ethylhexyl phosphate was not used. The pelletized lactic acid-based polyester composition thus obtained showed a weight-average molecular weight of 106,000.

The pelletized lactic acid-based polyester composition apparently looked brown and transparent and gave a strong scent. The lactic acid-based polyester composition showed a residual lactide content of 3.8%. The lactic acid-based polyester composition had a melting point of 157° C. Further, the lactic acid-based polyester composition showed a drop of 14% and 13% in the weight and molecular weight, respectively, after thermal stability test and a molecular weight drop of 17% after storage stability test. Thus, the lactic acid-based polyester composition thus obtained showed a poor stability.

COMPARATIVE EXAMPLE 3

The procedure of Example 7 was followed to obtain a pelletized lactic acid-based polyester composition except that the mixture of monohexadecyl phosphate and dihexadecyl phosphate was not used. The pelletized lactic acid-based polyester composition thus obtained showed a weight-average molecular weight of 102,000. The pelletized lactic acid-based polyester composition apparently looked brown and gave a strong scent. The lactic acid-based polyester composition showed a residual lactide content of 3.1%. The lactic acid-based polyester composition had a melting point of 161° C. Further, the lactic acid-based polyester composition showed a drop of 10% and 8% in the weight and molecular weight, respectively, after thermal stability test and a molecular weight drop of 13% after storage stability test. Thus, the lactic acid-based polyester composition thus obtained showed a poor stability.

COMPARATIVE EXAMPLE 4

The procedure of Example 9 was followed to obtain a pelletized lactic acid-based polyester composition except that triethylenetetraminehexaacetic acid was not used. The pelletized lactic acid-based polyester composition thus obtained showed a weight-average molecular weight of 122,000. The pelletized lactic acid-based polyester composition apparently looked brown and transparent and gave a strong scent. The lactic acid-based polyester composition showed a residual/lactide content of 3.9%. The lactic acid-based polyester composition had a melting point of 162° C. Further, the lactic acid-based polyester composition showed a drop of 14% and 12% in the weight and molecular weight, respectively, after thermal stability test and a molecular weight drop of 16% after storage stability test. Thus, the lactic acid-based polyester composition thus obtained showed a poor stability.

COMPARATIVE EXAMPLE 5

The procedure of Example 10 was followed to obtain a lactic acid-based polyester composition in the form of sheet except that the mixture of monolauryl phosphate and dilauryl phosphate was not used. The sheet thus obtained showed a weight-average molecular weight of 118,000. The sheet gave a strong scent. The sheet showed a residual lactide content of 3.7%. The sheet had a melting point of 158° C. Further, the sheet showed a drop of 12% each in the weight and molecular weight after thermal stability test and a molecular weight drop of 15% after storage stability test. Thus, the sheet thus obtained showed a poor stability.

COMPARATIVE EXAMPLE 6

The procedure of Example 11 was followed to obtain a pelletized lactic acid-based polyester composition except that aluminum isopropoxide, monostearyl phosphate and distearyl phosphate were not used. The pelletized lactic acid-based polyester composition thus obtained showed a weight-average molecular weight of 84,000. The pelletized lactic acid-based polyester composition apparently looked brown and transparent and gave a strong scent. The lactic acid-based polyester composition showed a residual lactide content of 3.5%. The lactic acid-based polyester composition had a melting point of 156° C. Further, the lactic acid-based polyester composition showed a drop of 11% and 9% in the weight and molecular weight, respectively, after thermal stability test and a molecular weight drop of 14% after storage stability test. Thus, the lactic acid-based polyester composition thus obtained showed a poor stability.

COMPARATIVE EXAMPLE 7

The procedure of Example 13 was followed to obtain a pelletized lactic acid-based polyester composition except that hexamethylene diisocyanate and citric acid were not used. The pelletized lactic acid-based polyester composition thus obtained showed a weight-average molecular weight of 130,000. The pelletized lactic acid-based polyester composition apparently looked brown and transparent and gave a strong scent. The lactic acid-based polyester composition showed a residual lactide content of 3.8%, The lactic acid-based polyester composition had a melting point of 161° C. Further, the lactic acid-based polyester composition showed a drop of 12% and 11% in the weight and molecular weight, respectively, after thermal stability test and a molecular weight drop of 15% after storage stability test. Thus, the lactic acid-based polyester composition thus obtained showed a poor stability.

COMPARATIVE EXAMPLE 8

The procedure of Example 14 was followed to obtain a lactic acid-based polyester composition in the form of sheet except that pyromellitic anhydride, triethylenetetraminehexaacetic acid and the mixture of monostearyl phosphate and distearyl phosphate were not used. The sheet thus obtained showed a weight-average molecular weight of 124,000. The sheet gave a strong scent. The sheet showed a residual lactide content of 3.3%. The sheet had a melting point of 152° C. Further, the sheet showed a drop of 13% and 12% in the weight and molecular weight, respectively, after thermal stability test and a molecular weight drop of 13% after storage stability test.

As mentioned above, the present invention provides a process for the preparation of a biodegradable lactic acid-based polyester composition excellent in thermal stability, storage stability, flexibility, heat resistance, mechanical and physical properties and moldability which comprises kneading a lactic acid-based polyester and a polyester consisting of dicarboxylic acid component(s) and diol component(s) with a chelating agent, an acidic phosphoric acid ester, a molecular weight increasing agent, etc., and then devolatilizing the kneaded mixture. The present invention also provides a molding process of the foregoing lactic acid-based polyester composition.

While the invention has been described in detail and with reference to specific embodiments thereof, it will be apparent to one skilled in the art that various changes and modifications can be made therein without departing from the spirit and scope thereof.

What is claimed is:

1. A process for the preparation of a lactic acid-based polyester composition, which comprises melt-kneading a lactic acid-based polyester (A), a polyester (B) consisting of dicarboxylic acid component(s) and diol component(s) and a chelating agent and/or acidic phosphoric acid ester (C) in an amount such that the weight ratio (A)/(B) is from 99/1 to 10/90 and the proportion of (C) is from 0.001 to 5 parts by weight based on 100 parts by weight of the sum of (A) and (B).

2. A process for the preparation of a lactic acid-based polyester composition, which comprises melt-kneading either of a lactic acid-based polyester (A) or a polyester (B) consisting of dicarboxylic acid component(s) and diol component(s) with a chelating agent and/or acidic phosphoric acid ester C), and then melt-kneading the resulting material with the remainder of said polyester (A) or said polyester (B), or comprises melt-kneading a lactic acid-based polyester (A) with a chelating agent and/or acidic phosphoric acid ester (C) and melt-kneading a polyester (B) consisting of dicarboxylic acid component(s) and diol component(s) with a chelating agent and/or acidic phosphoric acid ester (C), separately, and then melt-kneading the both resulting materials, wherein the weight ratio (A)/(B) is from 99/1 to 10/90 and the proportion of (C) is from 0.001 to 5 parts by weight based on 100 parts by weight of the sum of (A) and (B).

3. A process for the preparation of a lactic acid-based polyester composition, which comprises melt-kneading a melt-kneaded mixture of a lactic acid-based polyester (A) and a chelating agent and/or acidic phosphoric acid ester (C) with a polyester (B) consisting of dicarboxylic acid component(s) and diol component(s) in an amount such that the weight ratio (A)/(B) is from 99/1 to 10/90 and the proportion of (C) is from 0.001 to 5 parts by weight based on 100 parts by weight of the sum of (A) and (B).

4. The process for the preparation of a lactic acid-based polyester composition according to any one or claims 1 to 3, wherein a molecular weight increasing agent (D) is added to said lactic acid-based polyester (A) and/or polyester (B) consisting of dicarboxylic acid component(s) and diol component(s) in an amount of from 0.001 to 5 parts by weight based on 100 parts by weight of the sum of (A) and (B) before or at the same time with the melt-kneading with said chelating agent and/or acidic phosphoric acid ester (C).

5. The process for the preparation of a lactic acid-based polyester composition according to any one of claims 1 to 3, wherein the melt-kneading with said chelating agent and/or acidic phosphoric acid ester (C) is followed by the removal of volatile components under reduced pressure.

6. The process for the preparation of a lactic acid-based polyester composition according to any one of claims 1 to 3, wherein sand lactic acid-based polyester (A) is a polylactic acid.

7. A lactic acid-based polyester composition, prepared by the preparation process according to any one of claims 1 to 3.

8. A molding process of a lactic acid-based polyester composition, which comprises kneading a lactic acid-based polyester (A) and a polyester (B) consisting of dicarboxylic acid component(s) and diol component(s) with a chelating agent and/or acidic phosphoric acid ester (C), and then molding the material.

9. A molding process of a lactic acid-based polyester composition, which comprises melt-kneading a lactic acid-based polyester (A) and a polyester (B) consisting of dicarboxylic acid components) and diol component(s) with a chelating agent and/or acidic phosphoric acid ester (C), removing volatile components from the material under reduced pressure, and then molding the material.

10. A molding process of a lactic acid-based polyester composition, which comprises melt-kneading a lactic acid-based polyester (A) with a chelating agent and/or acidic phosphoric acid ester (C), removing volatile components from the material under reduced pressure, and then kneading the material with a polyester (B) consisting of dicarboxylic acid component(s) and diol component(s), and then molding the material.

11. The molding process of a lactic acid-based polyester composition according to any one of claims 8 to 10, wherein said lactic acid-based polyester (A) and/or polyester (B) consisting of dicarboxylic acid component(s) and diol component(s) is melt-kneaded with a molecular weight increasing agent (D) before or at the same time with the melt-kneading with said chelating agent and/or acidic phosphoric acid (C).

12. The molding process of a lactic acid-based polyester composition according to any one of claims 8 to 10, wherein said lactic acid-based polyester (A) is a polylactic acid.

* * * * *